Oct. 30, 1951 W. J. BROWN 2,573,092
TRACTION ATTACHMENT FOR VEHICLE TIRES
Filed April 20, 1948
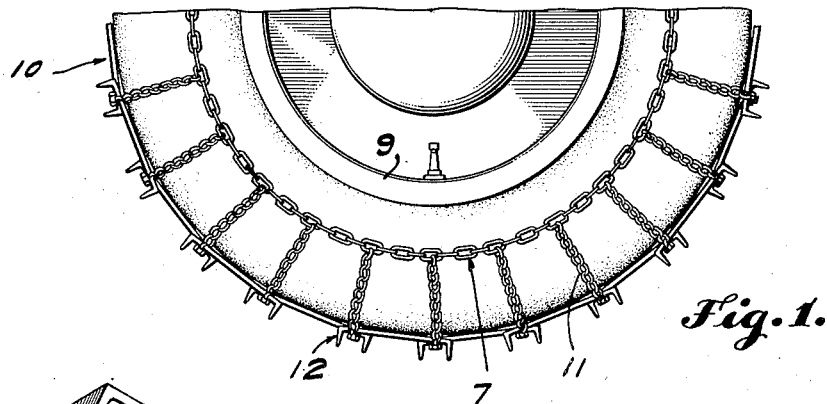
Fig. 1.
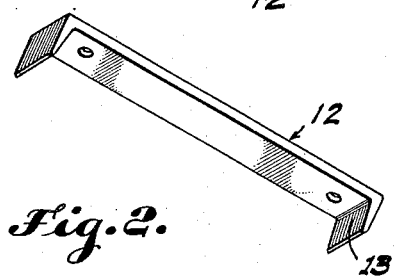
Fig. 2.
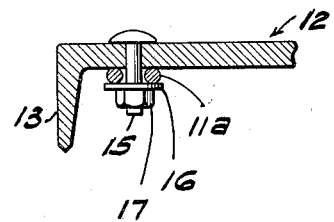
Fig. 3.
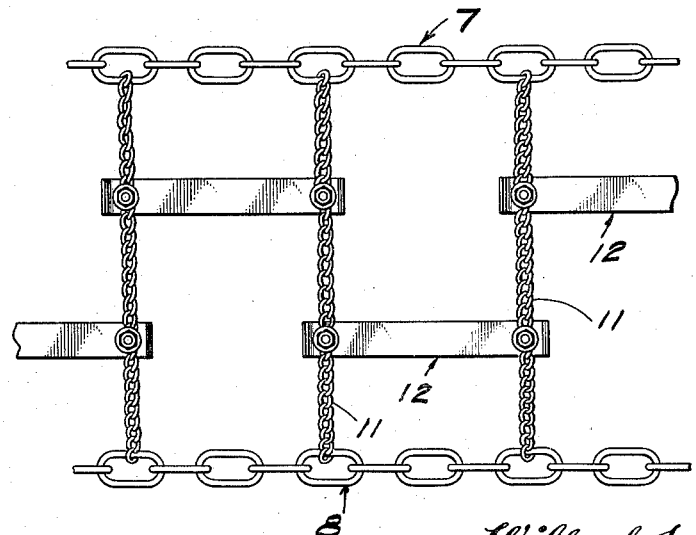
Fig. 4.
Wilfred J. Brown,
INVENTOR.
BY
ATTORNEY Patented Oct. 30, 1951

2,573,092

UNITED STATES PATENT OFFICE 2,573,092

TRACTION ATTACHMENT FOR VEHICLE TIRES

Wilfred J. Brown, Yuba, Wis.

Application April 20, 1948, Serial No. 22,123

1 Claim. (Cl. 152—239)

This invention relates to traction or anti-skid attachment for the tires of self-propelled vehicles.

Although numerous devices of the class to which this invention pertains have already been patented there still appears to be room for improvement upon such devices, particularly in the direction of simplification of structure, lowered cost of manufacture, and a more symmetrical, balanced arrangement of the anti-skid elements.

Accordingly, among the objects of the present invention are: to provide an improved, metal anti-skid element for the attachment in a sufficient number to chains encircling a vehicle wheel to insure the desired amount of traction even upon icy and other unfavorable road beds; to provide a set of anti-skid, metal elements each element of which will be furnished with a plurality of road-bed penetrating parts which are arranged in a symmetrical manner and are so positioned to perform the intended function in a superior manner; and to provide superior means to attach said anti-skid elements to chains encircling the vehicle wheels.

The metal from which the surface engaging elements may be made is of sufficient rigidity to prevent any material bending in use such as lengths of heavy gauge strap steel or rectangular stock with the ends bent up, or narrow widths cut from wide shallow channel shapes, but for convenience will be referred to hereinafter as "strap steel."

Other objects, advantages and features of invention will hereinafter appear.

Referring to the accompanying drawing, which illustrates a preferred embodiment of the invention, Fig. 1 is a side elevation of the lower half of a vehicle wheel, showing the invention applied thereto.

Fig. 2 is a perspective view showing separately one of the anti-skid strap metal bars having a spade-like, laterally directed flange at each end to grip or penetrate the road bed.

Fig. 3 is a longitudinal midsection showing one end portion of the bar of Fig. 2 on a larger scale.

Fig. 4 is a bottom plan view of an extended section or segment of an arrangement of anti-skid chains equipped with a plurality of the strap metal road bed gripping elements to which the invention pertains.

Referring in detail to the drawing, the chain structure comprises two twin, circular, endless main chains 7 and 8 each of which extends circumjacent to the felloe 9 of the wheel 10, the chain 7 engaging the outer or obverse face of the wheel shown, and the chain 8 engaging the inner or reverse face of said wheel.

Transversely of the tread portion of the tire extend a multiplicity of cross chains 11, each of these chains having its opposite ends secured to the aforesaid main chains.

The anti-skid structure of which the chains that have been mentioned form a part is completed by providing a multiplicity of parallel strap metal (strap steel) anti-skid members 12, said members lying between said parallel chains and the tread portion of the tire. Each of these strap metal members has at each end an outwardly directed roadbed gripping, sharpened flange 13, these flanges being formed by outwardly deflecting rightangularly the end portion of each strap iron across its entire width. The strip metal members can be removed and replaced after their flanges 13 have been resharpened, which is an economy feature.

The aforesaid strap metal members 12, as best shown in Fig. 4, are arranged in two rows each of which extends circumferentially of the tire and vehicle wheel, the straps of one row being staggered in relation to those of the other. Whenever two cross chains 11 come adjacent to each other they are connected by a said strap metal element in one or the other of said rows. The preferred means for attaching the strap metal members to the cross chains, best shown in Fig. 3, consists of stove bolts 15 which carry washers 16 against which are screwed down nuts 17 which grip the cross chain link 11a, through which the bolt passes between said washer and that face of the strap metal from which the flange 13 projects.

The fastening means for holding in place the strap metal members is placed close to each of their flanges 13 and is connected with each cross chain 11 about one-third the length of the cross chain in relation to one end or the other of said cross chain. The cross chains have their end links enclosing the side runs of selected links of the main chain 8, as best shown in Fig. 4.

By the symmetrical arrangement of the strap metal members which has been described, the members of the two rows being staggered, or arranged in a zig-zag manner, and being equally spaced away from the midwidth of the tread of the tire, a uniform, efficient roadbed grip is obtained for the structure considered as a whole which results not only in better traction but also resists skidding due to the plurality of spaced chisel like road surface penetrating edges under the tread of the tire.

The particular kind of chains used in the chain portion of the device may be varied without exceeding the scope of the claimed invention, but, by preference and as shown, the main chains 7 and 8 are made up of large, equally sized elliptical links, connected links being disposed rightangularly in relation to each other, and the cross chains 11 are made of smaller links of the twist link type, the links through which the bolts 15 extend being expanded, if necessary, to provide openings through them large enough to receive said bolts.

It will be seen that each strap metal member presents an extended, flat surface to the tire which keeps said member from falling in between bar treads on the tire, or other elongated protuberances thereof. Said extended, flat surface also minimizes wear of the tire on which the chains are used. Several of the strap metal members always engage the roadbed at the same time, adding to their tractive force.

When the wheel begins to roll onto or off from each strap metal member it pushes the opposite end of such member away from the tire. This is an important factor in preventing the spaces between the spade-like end flanges 13 of the strap metal members from filling up with mud, snow or loose dirt when such substances overlie the roadbed. As the vehicle advances the tire yields and maintains a flat portion next to the surface over which it rolls, and this flat surface affords a smooth footing against which the back surfaces of the strap metal members abut, as the vehicle advances. This affords a larger surface for the spade-like flanges to engage increasing their tractive power.

A vehicle equipped with this invention, in conjunction with properly inflated pneumatic tires, possesses a superior riding quality.

Owing to the broadly channel shaped character of the anti-skid members 12 they may be manufactured in a rapid, inexpensive manner, if desired, by cutting short lengths off from standard rolled wide channel shapes, and subsequently sharpening to the desired extent the flanges 13.

It should be understood that the present disclosure is for the purpose of illustration only and that this invention includes all modifications and equivalents which fall within the scope of the subject matter claimed.

I claim:

In an anti-skid device for the tire of a vehicle wheel, a pair of chains disposed circumferentially at the respective side walls of the tire, a multiplicity of cross chains connected to said side wall chains and extending transversely of the side and tread portion of the tire at circumferentially spaced intervals, a plurality of transversely staggered elements attached to said cross chains and directed circumferentially of the tread surface of the tire, each of said elements comprising an elongated flat rigid bar extending between an adjacent pair of cross chains with the ends extending beyond said pair of chains and having an outwardly extending right angular flange at each of said ends closely adjacent each of said cross chains with successive bars offset transversely to provide two circumferentially arranged sets of said flanged bars.

WILFRED J. BROWN.

REFERENCES CITED

The following references are of record in the file of this patent:

UNITED STATES PATENTS

| Number | Name | Date |
| --- | --- | --- |
| 1,617,034 | Stanley | Feb. 8, 1927 |
| 2,146,364 | Ashley | Feb. 7, 1939 |

FOREIGN PATENTS

| Number | Country | Date |
| --- | --- | --- |
| 865,400 | France | May 21, 1941 |